United States Patent [19]

Baker et al.

[11] Patent Number: 5,056,096
[45] Date of Patent: Oct. 8, 1991

[54] HYBRID DOPED FIBER-SEMICONDUCTOR AMPLIFIER RING LASER SOURCE

[75] Inventors: Robert A. Baker, London; Wilson Sibbett; David Burns, both of Fife, all of England

[73] Assignee: STC PLC, London, England

[21] Appl. No.: 583,590

[22] Filed: Sep. 17, 1990

[30] Foreign Application Priority Data

Sep. 20, 1989 [GB] United Kingdom ............... 8921295

[51] Int. Cl.$^5$ .................... H01S 3/098; H01S 3/23
[52] U.S. Cl. ........................ 372/6; 372/18; 372/25; 372/44; 372/68; 372/93; 385/32; 385/27; 385/49; 359/341
[58] Field of Search ............ 372/6, 93, 94, 43, 44, 372/50, 18, 97, 68, 25, 26; 356/350; 350/96.14, 96.15, 96.17

[56] References Cited

U.S. PATENT DOCUMENTS

| | | | |
|---|---|---|---|
| 4,431,308 | 2/1984 | Mitsubashi et al. | 356/350 |
| 4,728,168 | 3/1988 | Alferness et al. | 350/96.14 |
| 4,852,117 | 7/1989 | Po | 372/97 |
| 4,859,016 | 8/1989 | Shaw et al. | 350/96.15 |
| 4,955,025 | 9/1990 | Mears et al. | 372/6 |
| 4,964,131 | 10/1990 | Liu et al. | 372/6 |
| 4,986,661 | 1/1991 | Vick | 356/350 |

FOREIGN PATENT DOCUMENTS 0224070 10/1986 European Pat. Off. .

OTHER PUBLICATIONS

Electronics Letter, vol. 25, No. 17, 17th Aug. 1989, pp. 1131-1133, R. A. Baker et al., "Amplification of A Mode-Locked Semiconductor Diode Laser Pulses in Eriauin-Doped Fibre Amplifier".

*Primary Examiner*—William L. Sikes
*Assistant Examiner*—Galen J. Hansen
*Attorney, Agent, or Firm*—Lee, Mann, Smith, McWilliams & Sweeney

[57] ABSTRACT

An hybrid laser source has a ring structure including the optical path in a semiconductor amplifier chip (1) and optical fibres (2, 3 and 4). The fibre (2) is rare-earth doped and provides an additional gain medium in the ring, the chip providing its own gain medium. The two gain media are interactive and when the chip input current is modulated the source produces relatively high peak power ultrashort pulses (FIG. 1).

5 Claims, 1 Drawing Sheet

HYBRID DOPED FIBER-SEMICONDUCTOR AMPLIFIER RING LASER SOURCE

BACKGROUND OF THE INVENTION

This invention relates to laser sources and in particular to those incorporating rare earth doped fiber, for example erbium doped fiber.

SUMMARY OF THE INVENTION

According to the present invention there is provided an hybrid laser source comprising a semiconductor diode amplifier chip and a length of rare-earth-doped single mode optical fiber, the optical path within the chip forming part of a ring and another part of the ring being comprised by said fiber, which fiber provides an external cavity having distributed gain for the chip.

BRIEF DESCRIPTION OF THE DRAWINGS

Embodiments of the invention will not be described with reference to the accompanying drawings, in which.

DESCRIPTION OF THE PREFERRED EMBODIMENTS

It has previously been proposed to employ erbium-doped fiber as a fiber amplifier. An optical signal input to one end of a length of erbium-doped fiber can be amplified during its passage therealong.

In GB Patent Application No. 8908671.3 (K. C. Byron - W. Sibbett 38-3) there is described a tuneable source employing such a length of fiber. It has also been proposed in our paper "Amplification of mode-locked semiconductor diode laser pulsars in an erbium-doped fiber amplifier" [R. A. Baker, D. Burns, K.C. Byron, W. Sibbett. Electronic Letters IEE 17th Aug. 1989, Vol. 25 No. 17 p 1131-3] to amplify picosecond pulses, from an actively mode-locked semiconductor diode laser having an external cavity, in a pumped erbium-doped fiber amplifier. In this case the output of the external-cavity laser was applied to one end of the fiber amplifier and the pump was applied to the other end, the output being taken from adjacent the other end by means of a coupler.

Figure 1:
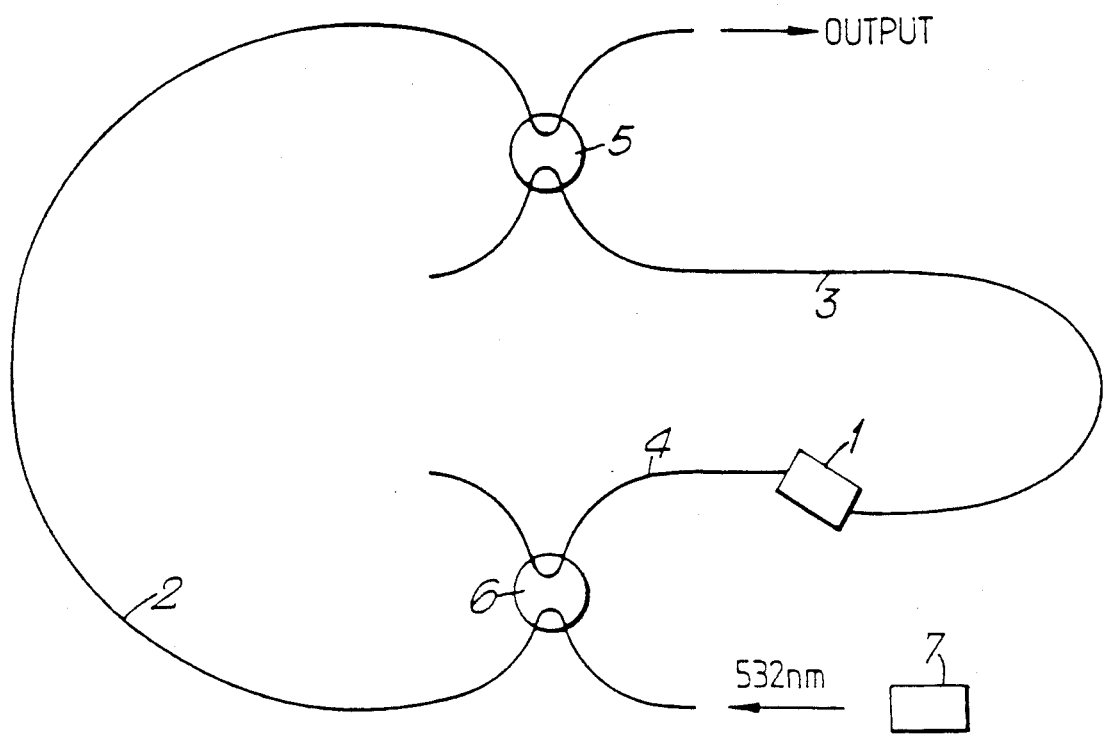
FIG. 1 illustrates a doped fiber ring laser according to an embodiment of the present invention and FIG. 2 illustrates the streak intensity profiles of pulses produced by an arrangement according to FIG. 1.

We now propose a laser configuration in which the amplifier fiber comprises an external fiber cavity of a semiconductor diode laser oscillator. In this proposed hybrid configuration the external fiber cavity provides access to distributed gain. An example of the configuration is illustrated in FIG. 1. An InGaAsP diode amplifier chip 1 is disposed in a ring cavity arrangement that includes a length 2 of rare-earth-doped, in particular erbium-doped, monomode optical fiber, and lengths 3 and 4 of monomode optical fiber. Couplers 5 and 6 serve to couple the ends of the erbium-doped fiber 2 to the fiber lengths 3 and 4. The diode amplifier chip may have its facets AR-coated or angled and AR coated. Emissions from the facets are directly coupled to fiber lengths 3 and 4. The erbium fiber is optically pumped by means 7, such as by a frequency-doubled (532 nm) Nd:YAG laser or a titanium-sapphire laser operating at 980 nm. In tests the length of the diode amplifier chip was 500 μm and that of the erbium-doped (300 ppm) fiber was 5 m. It should be noted that this leads to laser dynamics that are quite specific. The ring-cavity scheme should not be regarded as simply a mode-locked diode laser operating in conjunction with a distributed amplifier. When the injection current to the diode amplifier chip 1 is modulated, the pulse evolution processes develop in the system as a whole so that both gain media (chip and erbium-doped fiber) play important and interactive roles. The system, therefore, has hybridized operational characteristics and as such it has the inherent ability to produce relatively high peak power ultra-short pulses with the potential for exceptionally low phase-noise properties.

The combination of picosecond pulse durations, peak powers in the W regime and low phase noise suggest potential major importance of such sources in future optical systems. If the erbium-doped fiber is pumped by a strained-layer semiconductor diode laser that operates at 980 nm, a particularly practical, compact and reliable digital optical source results.

Figure 2:
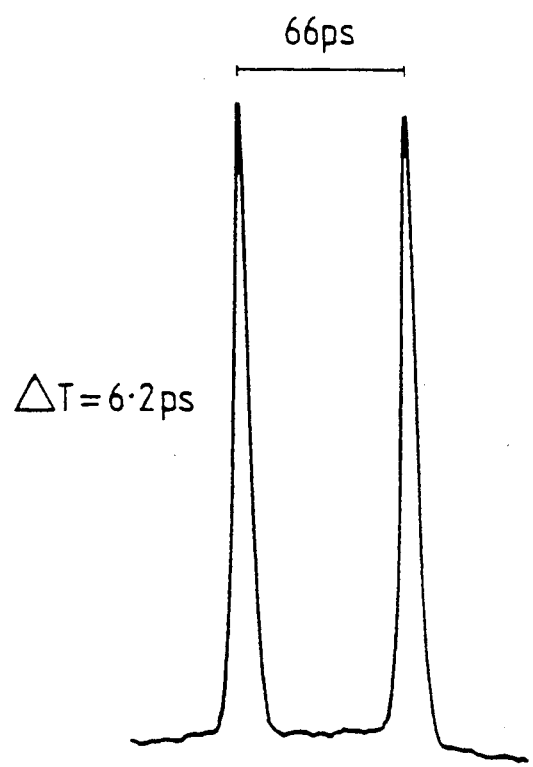

FIG. 2 illustrates the result obtained with the arrangement of FIG. 1 and the various parameters quoted above. The diode amplifier was injection current modulated at a frequency of 612 MHz. The time domain data of FIG. 2 confirms that high-quality picosecond pulses are produced by this arrangement. Specifically,. the streak intensity profiles (linear intensity scale) in FIG. 2 indicate that the pulses are discrete and have deconvolved durations of the order of 5 ps. Using second harmonic generation auto-correlation measurements that offer better time resolution, the pulse durations were confirmed to be of the order of 4 ps. The measured average laser power was in excess of 4 mW which represents a peak pulse power of more than 1.5W. At this level of peak power, optical non-linearities in fiber (such as the Kerr effect referred to in GB Patent Application No. 8909671.3) and other waveguide structures can become significant and potentially exploitable.

As will be appreciated from FIG. 1, the hybrid laser source has a ring structure comprised by the optical path within the chip 1 and the fibers 2, 3 and 4, and the fiber 2 provides an external cavity for the chip which has distributed gain. Such a source is high speed and stable and may be modulated.

We claim:

1. An hybrid laser source comprising a semiconductor diode amplifier chip, a length of rare-earth-doped single mode optical fiber, first and second optical couplers coupling the chip and the rare-earth-doped fiber together in a ring, and an optical pumping source for the rare-earth-doped fiber, which pumping source is external to the ring and is coupled to the rare-earth-doped fiber via said first optical coupler, a hybrid laser source output being provided by the second optical coupler, the ring comprising a resonant cavity for the hybrid laser source, and the hybrid laser source gain medium being comprised by the rare-earth-doped fiber and the chip.

2. An hybrid laser source as claimed in claim 1 wherein the rare-earth is erbium.

3. An hybrid laser source as claimed in claim 1 wherein the chip is an InGaAsP amplifier chip.

4. An hybrid laser source as claimed in claim 1 wherein the optical pumping means is comprised by a strained-layer semiconductor diode laser.

5. An hybrid laser source as claimed in claim 1, wherein the ring further includes first and second lengths of single mode optical fiber between which the chip is dispersed, the first length of single mode fiber being coupled to the rare-earth-doped fiber by the first optical coupler and the second length of single mode fiber being coupled to the rare-earth-doped fiber by the second optical coupler.

* * * * *